Figure 1:
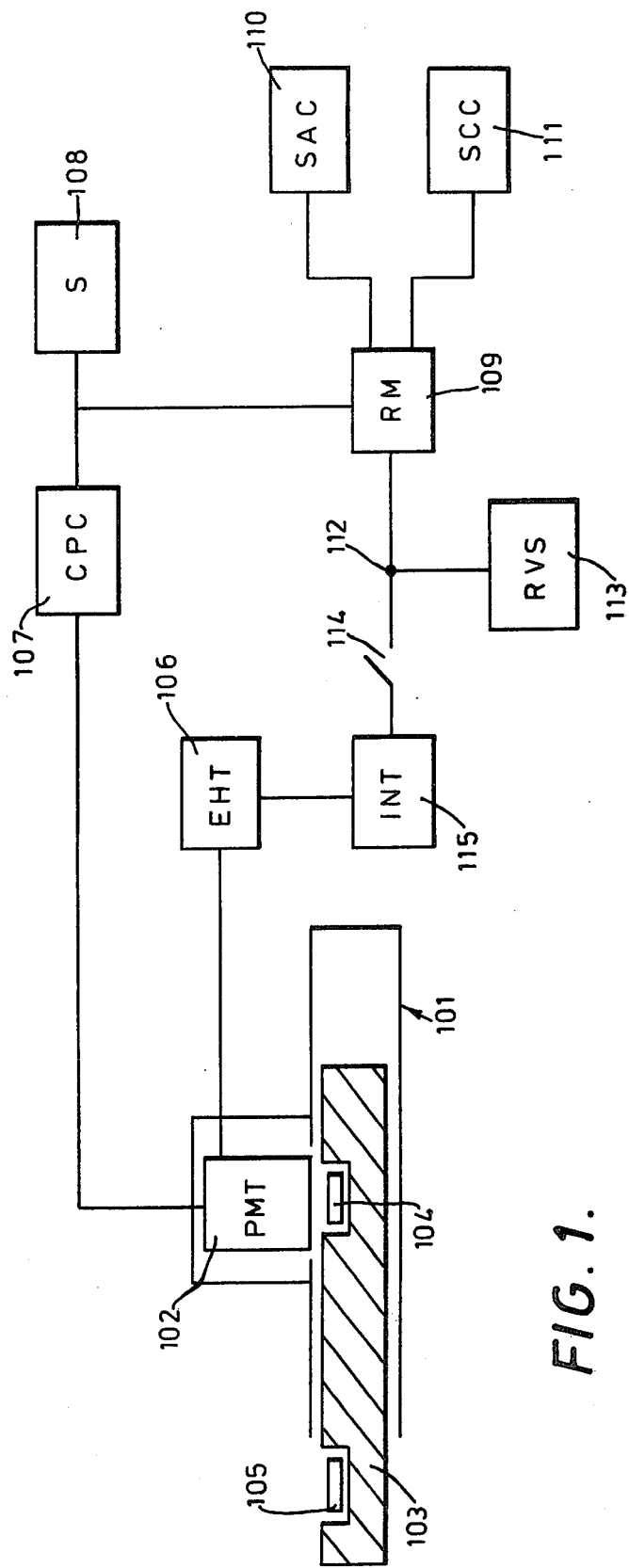

United States Patent [19]
Robertson et al.

[11] 3,925,665
[45] Dec. 9, 1975

[54] THERMOLUMINESCENCE DOSIMETER READER

[75] Inventors: Malcolm Eric Alexander Robertson, Brookwood; John Marshall, Camberley; Jules Anthony Peter Brabants, Walton-on-Thames; Michael Edward Davies, Maidenhead, all of England

[73] Assignee: D.A. Pitman Limited, Weybridge, England

[22] Filed: Aug. 14, 1974

[21] Appl. No.: 497,507

[30] Foreign Application Priority Data
Aug. 17, 1973 United Kingdom............... 38989/73

[52] U.S. Cl. .............................................. 250/337
[51] Int. Cl.² ........................................... G01T 1/11
[58] Field of Search ........... 250/252, 336, 337, 207; 328/173, 175, 243

[56] References Cited
UNITED STATES PATENTS
3,714,441  1/1973  Kreda ................................. 250/207

Primary Examiner—Davis L. Willis
Attorney, Agent, or Firm—Baldwin, Wight & Brown

[57] ABSTRACT

An electric circuit arrangement including a photomultiplier tube and an high voltage source therefor also includes a feedback loop from the output of the tube to the high voltage source, and loop providing automatic gain stabilisation for the tube. The arrangement is used in a dosimeter reader to provide sensitivity correction for the reader each time the reader is to be used.

20 Claims, 6 Drawing Figures

THERMOLUMINESCENCE DOSIMETER READER

This invention relates to an electric circuit arrangement including a photomultiplier tube and high voltage source therefor.

Such circuit arrangements are used in thermoluminescence dosimeter (TLD) readers. Such readers are used to measure the amount of radiation a dosimeter has been subjected to, the measurement being effected by heating the dosimeter and then determining the light output from the dosimeter, the light output being proportional to the amount of radiation. The light output is "read" by the photomultiplier tube which is used to feed a visual display device.

With known arrangements it has not been possible to obtain accurate measurements without having repeatedly to check the sensitivity of the reader, changes in which are caused in the main by drift in the gain of the photomultiplier tube, attributable to ambient temperature change, i.e. "first order drift".

The average temperature coeffeicient of the gain of a photomultiplier tube is poor, being approximately 1% per degree centigrade, and in an attempt to stabilise the gain of the photomultiplier tube, thermo-electric cooling equipment has been used to hold the photomultiplier tube at a fairly constant temperature. However, such equipment is expensive and cannot compensate for fluctuations in gain caused by photomultiplier tube aging, or for variations in the light path between a dosimeter being measured and the photomultiplier tube photo-cathode due, for example, to dust collection, and system sensitivity checks are still necessary to correct for these factors.

Arrangements are known incorporating standard light sources which are used to check the sensitivity of the arrangement, but such checking entails taking readings frequently and making compensation for fluctuations by altering manually the setting of the high voltage source.

According to the invention there is provided an electric circuit arrangement including a photomultiplier tube and a high voltage source therefor, wherein there is provided a feedback loop from the output of said tube to said high voltage source thereby to provide automatic gain stabilisation for said tube.

Also according to this invention there is provided a dosimeter reader including an arrangement according to the immediately preceding paragraph.

Figure 2A:
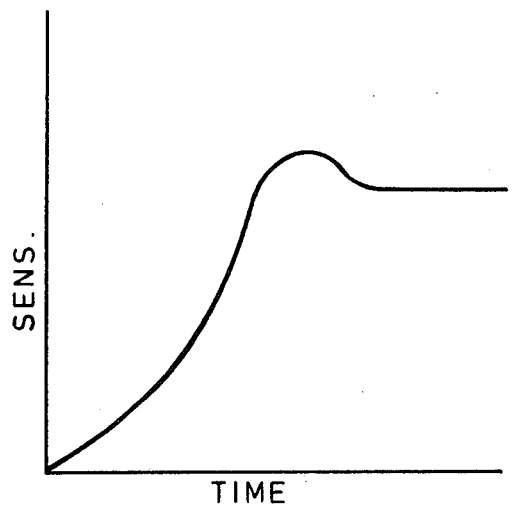
Figure 3A:
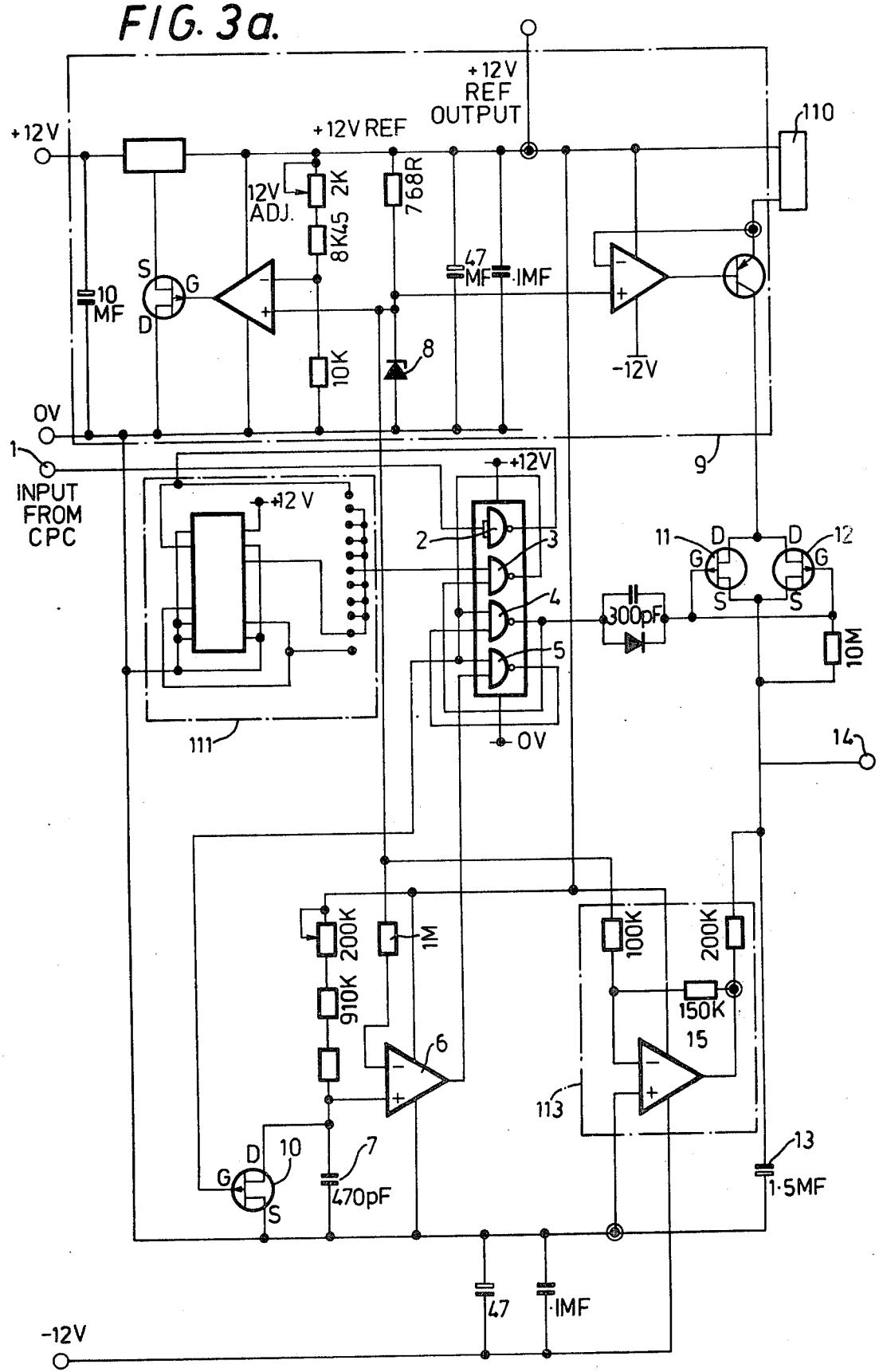

One embodiment of the invention will now be described by way of example with reference to the drawings, in which:

FIG. 1 is a schematic block diagram of a thermoluminescence dosimeter reader employing an electric circuit arrangement according to the invention;

FIGS. 2(a), (b) and (c) are curves illustrating the operation of the arrangement of FIG. 1; and FIGS. 3(a) and (b) show a circuit diagram of the rate meter of FIG. 1 and diagrams illustrating its operation respectively.

The TLD reader of FIG. 1 includes a reader head unit 101 having a photomultiplier tube 102 and a drawer 103 which, when in an open position as shown, positions a standard light source 104 in front of the tube 102, and when in a closed position, places a dosimeter holder 105 in front of the tube 102. The tube 102 is fitted with an infra-red filter and should have a dark current very much lower than the current due to the light source 104, for example, $10^4$ x lower. The light source 104 consists of a radioactive source uniformly dispersed in a plastics scintillator, and has a temperature coefficient of 400 ppm/°C.

The tube 102 is supplied by a high voltage source 106 which is a direct current to direct current converter having an oscillator operated in Class D to transform a direct current input to alternating current followed by a transformer, the output from which is rectified and smoothed before being passed to the tube 102. The gain of the tube 102 is directly proportional to the voltage supplied by the high voltage source 106.

Output current from the tube 102 is applied to a current-to-pulse (CTP) converter 107 which is a high speed linear device including a capacitor network charged in accordance with the current from the tube 102 and periodically discharged by control circuitry to produce output pulses at a repetition frequency which is directly proportional to the input current. The converter 107 is linear over a wide input current range. A scaler 108 is used to display the signal, integrated over a desired time interval produced, by the converter 107, and consists of a standard six digit display device with an input circuit that ensures rapid readout.

The pulse signal from the converter 107 is also supplied to a rate meter 109 to be described in detail later with reference to FIG. 3.

A sensitivity control unit 110 forming part of the rate meter 109, includes a 5-digit thumbwheel switch which operates to provide a variable signal which controls the rate meter 109 to initiate alteration of the gain of the tube 102 to effect a change in the sensitivity of the reader. The thumbwheel switch provides three decades of variable tube gain so that the sensitivity of the reader can be set in steps from 1 to 1,000.

A sensitivity calibrate control 111 forming another part of the rate meter 109, is provided to calibrate the reader during manufacture.

The rate meter 109 produces an output signal dependent upon the repetition frequency of the pulse signal from the converter 107, and the sensitivity setting governed by the sensitivity control unit 110, and this output signal is supplied to summation point 112 to which there is also supplied a reference voltage from a source 113.

On closure of a switch 114, the signal at summation point 112 is supplied to an integrator 115. The integrator 115 is a high gain (approximately 500,000) single-ended differential integrator with a MOSFET buffer input and a stable virtual earth, and basically consists of a low input current operational amplifier with capacitive feedback. Critical damping is employed to ensure optimum response, and the output voltage from the integrator 115 will reach an average value when the input level averages near zero. If at this point the input signal is removed, the output will be held at a constant level, dependent upon the low input current of the amplifier and low leakage of the capacitive feedback component.

The output signal from the integrator 115 serves as a low tension input control voltage applied to the high voltage source 106.

The light source 104, the rate meter 109 and the reference voltage source 113 are each designed to have a very low temperature coefficient.

In use, the sensitivity is selected by appropriate setting of the thumbwheel switch in the sensitivity control unit 110, and the drawer 103 is moved to the open position shown in FIG. 1 so that the photocathode of the tube 102 is stimulated by low level light from the light source 104. At the same time the switch 114 is closed.

The effect of closing the switch 114 is that the high voltage source 106 is adjusted automatically to establish the desired sensitivity of the reader and to compensate for any drift in the gain of the tube 102 due to fluctuations in ambient temperature, fatigue, aging and dirt collection on objects in the light path such as the tube photocathode window or infra-red filter and also drift in various circuit parameters whose temperature coefficient permits such change. In this mode a constant current proportional to the steady light level of the light source 104 is available at the anode of the tube 102 and is applied to the converter 107, which, in turn, supplies a pulse signal to the rate meter 109 at a repetition frequency directly proportional to the anode current of the tube 102. In the absence of an output from the converter 107, the signal at summation point 112 is at a negative potential (FIG. 3(b) iv) due to the reference source 113, and as soon as a signal is generated by the converter 107, the output from the rate meter 109 tends towards a positive potential. The voltage at summation point 112 follows this change, and the output from the integrator 115, previously at a maximum positive potential, commences to drop toward zero leading to a reduction in the value of the high voltage supplied to the tube 102. Subsequent reduction in the anode current of the tube 102 drives the voltage at summation point 112 further towards zero so that the high voltage supply is lowered further until a steady state is reached at which the mean input level to the integrator 115 is substantially zero.

With the drawer 103 open, whenever the sensitivity is changed by means of the thumbwheel switches of the sensitivity control unit 110, the output from the rate meter 109 alters from its steady state away from zero so that the arrangement again adjusts until the mean voltage at summation point 112 approximates zero, at which time the gain of the overall system is stabilised, ie. the high voltage supply is of a value such that the sensitivity of the tube 102 against the light source 104 is maintained at a level preset by the sensitivity control unit 110.

Once stabilised the reader is ready to accept a dosimeter to be measured. The dosimeter is placed in the tray 105 and the drawer 103 is closed so that the dosimeter is positioned in front of the photocathode of the tube 102. Closure of the drawer 103 effects opening of the switch 114, and the high voltage supply is held constant by the integrator 115 which is designed such that changes in its output voltage are negligible with respect to the sensitivity of the arrangement over a maximum ten minute period. Auxiliary control circuits (not shown) ensure that if the switch 114 has been opened for this ten minute period, the switch 114 must again be closed before another measurement can be taken.

The dosimeter is then heated, and the required measurement of its light output made.

Figure 2B:
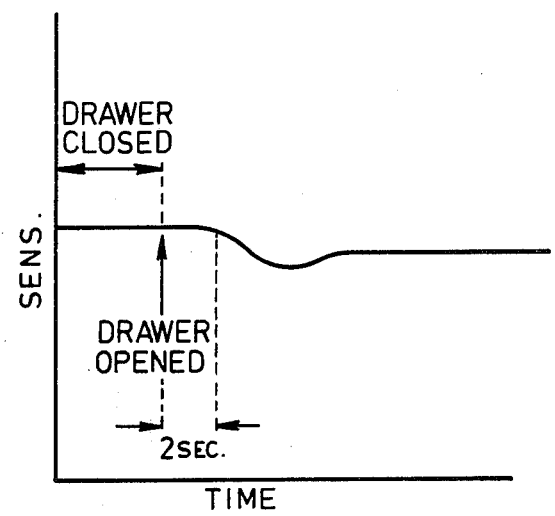

Characteristics of the sensitivity of the arrangement are shown in FIG. 2, and in each case the plot is sensitivity (Y axis) against time (X axis).

FIG. 2(a) shows a "start-up" condition commencing at the point when the reader is switched on. A period of approximately 120 seconds is needed for the reader to stabilise from the time at which it is switched on. From the previous description of the reader, it will be apparent that when the reader is switched on, the output of the integrator 115 will be at its highest positive value so that the voltage supplied by the high voltage source 106 to the tube 102 is at a maximum value, as will be the voltage at summation point 112. As the anode current of the tube 102 builds up, the sensitivity increases exponentially as shown in FIG. 2(a) due to the gradual increase in repetition frequency of the pulse signal from the converter 107, which causes the voltage at summation point 112 to be driven towards zero from its maximum negative level. As the sensitivity increases to a level set by the sensitivity control unit 110, there is a slight overshoot before the sensitivity finally settles at a desired level.

Having reached this condition, the reader is stabilised and is ready to accept a dosimeter to be read. After the reading has been taken the drawer 103 is opened for changing the dosimeter, this effecting closure of the switch 114. As can be seen from FIG. 2(b), 10 seconds is required for the arrangement to be restabilised to correct for any change in the sensitivity due to fluctuations in ambient temperature. Assuming such fluctuation has occurred, the arrangement will compensate for this as described above and as shown on the curve, after a slight overshoot due to withdrawal of the drawer 103.

Figure 2C:
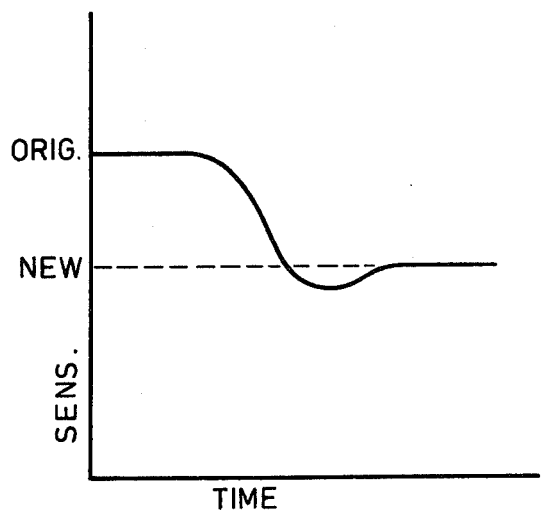

FIG. 2(c) shows what happens when the sensitivity is adjusted by operation of the thumbwheel switch of the sensitivity control unit 110. A period of 60 seconds is required for the reader to stabilise following such change. In the example shown the sensitivity has been lowered, and in the course of the change there is a slight overshoot as the reader adapts to the new desired sensitivity level.

Figure 3B:
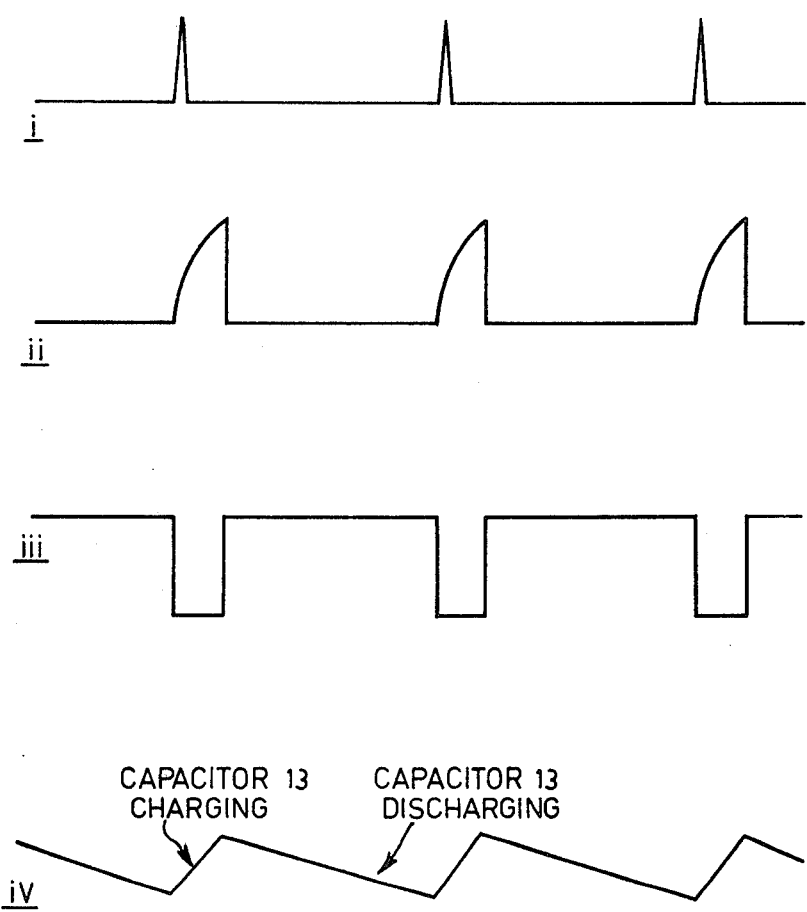

A preferred circuit arrangement for the rate meter 109 is shown in FIG. 3(a) and FIG. 3(b) shows a series of waveforms to facilitate understanding of the operation of the arrangement.

The rate meter converts the repetition frequency of the input pulse signal into an analogue form, i.e. an output voltage representing the input frequency. The embodiment illustrated in FIG. 3 is linear, and is designed to handle frequencies of a ratio of 1000-1 to an accuracy of better than 0.1%.

The pulse signal from the converter 107 is supplied via an input terminal 1 and an inverting gate 2 to the previously described calibration control unit 111. The output of the calibration control 111 feeds one input of a bistable device formed of three gates 3, 4 and 5 which together with the inverting gate 2 are in the form of an IC. The other input of the bistable device is fed from an IC amplifier 6 which serves to compare the charge on a capacitor 7 with a reference potential derived from a zener diode 8 forming part of a reference potential and constant current source 9 the output of which is controlled by the previously described sensitivity control unit 110. The capacitor 7 is bridged by a transistor 10 which ensures that the capacitor 7 is fully discharged during each charging cycle as will be described later.

One output of the bistable device, this being the output of the gate 3, controls the transistor 10, while the other output of the bistable device, this being the output of the gate 4, controls a high-speed switch comprising two parallel connected field-effect transistors 11 and 12. The switch 11, 12 controls the supply of current from the source 9 to a capacitor 13 and to the output terminal 14 of the arrangement.

The output terminal 14 constitutes the summation point 112 of FIG. 1, and is also fed with a reference potential derived from the zener diode 8 via an inverter amplifier 15, this forming the reference voltage source 113 of FIG. 1.

Operation of the above described rate meter will now be described with reference to FIG. 3(b).

Initially an output signal is present at the output of gate 3 of the bistable device, which signal holds the transistor 10 conductive and thus the capacitor 7 discharged. The output at gate 4 of the bistable device holds the switch 11, 12 open and thus the capacitor 13 is discharged.

On reception of a pulse from the converter 107 (line i of FIG. 3(b)) the bistable device is switched over to its other state, the transistor 10 thus being rendered nonconductive, and the switch 11, 12 being closed.

The capacitor 7 is thus charged from the source 9 until the charge thereof reaches the reference potential determined by the zener diode 8, at which point the amplifier 6 produces an output signal which returns the bistable device to its initial condition. Charging of the capacitor 7 is illustrated in line ii of FIG. 3(b).

While the bistable device is in its other state, and the switch 11, 12 thus closed, this being illustrated in line iii of FIG. 3(b), the capacitor 13 is charged from the source 9. When the bistable device is returned to its initial state and the switch 11, 12 thus opened, charging of the capacitor 13 ceases, and the capacitor 13 discharges.

This cycle of operation is repeated for each input pulse received from the convertor 107 (line i of FIG. 3(b)), and thus at output 14 there is obtained an output signal having the wave-form shown in line iv of FIG. 3(b), which output signal is supplied to the integrator 115.

We claim:

1. A thermoluminescence dosimeter reader comprising an electric circuit arrangement including a photomultiplier tube for detecting thermoluminescence from a dosimeter, said photomultiplier tube having an input connected to a high voltage source and an output for producing an output current signal, and wherein there is provided a feedback loop from said output to said high voltage source; said feedback loop comprising converter means connected to said output to convert the output current signal of said photomultiplier tube into a pulse signal having a repetition frequency proportional to said output current signal; a rate meter connected to said converter and to which said pulse signal is supplied and which provides an output voltage proportional to the repetition frequency of said pulse signal; a reference voltage source connected to said rate meter; and an integrator connected to said rate meter and said reference voltage source, and to which the output voltage from said rate meter and a reference voltage from said reference voltage source are supplied, so as to produce a high voltage output signal from said integrator which output signal, when supplied to said high voltage source, acts to control the output of said high voltage source, whereby to provide automatic gain stabilisation for said tube.

2. A reader as claimed in claim 1, including means connected to said rate meter to adjust the sensitivity of said rate meter and thereby to adjust the sensitivity of the gain stabilisation of said tube.

3. A reader as claimed in claim 1, including a switch connected between said rate meter and said reference voltage source, on the one hand, and said integrator on the other hand, and by way of which the output voltage from said rate meter and said reference voltage from said reference voltage source are supplied to said integrator.

4. A reader as claimed in claim 1, wherein said integrator is a differential integrator with a metal oxide semiconductor field effect transistor buffer input and a stable virtual earth.

5. A reader as claimed in claim 4, wherein said integrator comprises a low input current operational amplifier with capacitive feedback.

6. A reader as claimed in claim 1, including means connected to said converter for displaying said pulse signal from said converter integrated over a period of time.

7. A reader as claimed in claim 1, wherein said rate meter comprises a bistable device arranged to be switched by each pulse of said pulse signal from a first to a second state; a first capacitor arranged to be held discharged when said bistable device is in said first state, to begin to be charged when said bistable device is switched to said second state, and to switch said bistable device back to said first state when charged to a reference potential; a constant current source; a second capacitor connected to said constant current source and arranged to be charged by said constant current source; and a switch connected to said bistable device, said constant current source, and said second capacitor, said switch being controlled by said bistable device to be open when said bistable device is in said first state and to be closed when said bistable device is in said second state whereby said second capacitor is then charged by said constant current source, the charge of said second capacitor constituting the output voltage of said rate meter for supply to said integrator.

8. A reader as claimed in claim 7, wherein said capacitor is bridged by a transistor which is connected to said bistable device so as to be conductive when said bistable device is in said first state.

9. A reader as claimed in claim 7, wherein said switch by way of which said constant current source is connected to said second capacitor comprises a pair of parallel connected fieldeffect transistors.

10. A reader as claimed in claim 7, wherein there is provided a zener diode having a potential which may be used as a reference potential for said first capacitor and as said reference voltage for supply to said integrator, said zener diode forming part of said constant current source.

11. An automatic gain stabilization circuit for a photomultiplier tube, said photomultiplier tube having a sensitivity to radiation and including a cathode and an anode so as, upon detection of radiation at said cathode, to produce at said anode an output current characterized by a variable gain proportional to said sensitivity, said circuit comprising in combination:

converter means connected to said anode so as to receive said output current and to produce pulsed signals having a repetition frequency directly proportional to said output current;

rate meter means connected to said converter means so as to receive said pulsed signals and to supply to a summation point an output signal dependent on said repetition frequency;

reference voltage means connected to said summation point so as to supply a reference voltage thereto;

integrator means connected to said summation point so as to receive said output signal and said reference voltage, and to produce a control voltage; and high voltage source means connected to said integrator so as to receive said control voltage therefrom, and connected to said photomultiplier tube so as to supply thereto a high voltage signal for adjusting said variable gain, whereby said variable gain is stabilized.

12. A circuit as recited in claim 11 wherein said rate meter means includes sensitivity control means for producing, in response to a manual sensitivity setting, a sensitivity signal, and wherein said output signal from said rate meter means is dependent on said sensitivity signal, thus providing for manual variation of said sensitivity of said photomultiplier tube.

13. A circuit as recited in claim 11 including a switch between said summation point and said high voltage source means so as to transmit said output signal and said reference voltage to said integrator means upon closure of said switch.

14. A circuit as recited in claim 11 wherein said integrator means is a low input current, high gain operational amplifier with a metal oxide semi-conductor field effect transistor buffer input, and characterized by a stable virtual earth and capacitive feedback.

15. A circuit as recited in claim 11 wherein said converter means is linear over a wide input current range, and includes a display means for displaying said pulsed signals, integrated over a given time interval.

16. A circuit as recited in claim 11 wherein said rate meter means includes
a constant current source;
a bistable device having an input connected to said converter means and having at least first and second outputs;
transistor means connected to said first output so as to be conductive when said bistable device is in a first state and to be non-conductive when said bistable device is in a second state;
switch means connected to said second output so as to be open when said bistable device is in a first state and to be closed when said bistable device is in a second state;
a first capacitor means connected to said transistor means and to said constant current source so as to be discharged when said transistor means is conductive and to be charged by said constant source when said transistor means is nonconductive, said first capacitor means being additionally connected to said bistable device so that the charging of said first capacitor means to a reference voltage causes said bistable device to go from said second state to said first state; and
second capacitor means connected through said switch means to said constant current source so as to be discharged when said switch means is open and to be charged by said constant current source when said switch means is closed, said second capacitor means providing said output signal of said rate meter.

17. A circuit as recited in claim 16 wherein said switch means is a pair of parallel connected field effect transistors.

18. A circuit as recited in claim 16 wherein said constant current source includes a zener diode which provides said reference voltage.

19. A thermoluminescence dosimeter reader having a photomultiplier tube equipped with an automatic gain stabilization circuit, said photomultiplier tube having a sensitivity to radiation and including a cathode and an anode so as, upon detection of radiation at said cathode, to produce at said anode an output current characterized by a variable gain proportional to said sensitivity, said circuit comprising in combination:
converter means connected to said anode so as to receive said output current and to produce pulsed signals having a repetition frequency directly proportional to said output current;
rate meter means connected to said converter means so as to receive said pulsed signals and to supply to a summation point an output signal dependent on said repetition frequency;
reference voltage means connected to said summation point so as to supply a reference voltage thereto;
integrator means connected to said summation point so as to receive said output signal and said reference voltage, and to produce a control voltage; and
high voltage source means connected to said integrator so as to receive said control voltage therefrom, and connected to said photomultiplier tube so as to supply thereto a high voltage signal for adjusting said variable gain, whereby said variable gain is stabilized.

20. A thermoluminescence dosimeter reader having a photomultiplier tube equipped with an automatic gain stabilization circuit as defined in claim 19 wherein said rate meter means includes
a constant current source;
a bistable device having an input connected to said converter means and having at least first and second outputs;
transistor means connected to said first output so as to be conductive when said bistable device is in a first state and to be non-conductive when said bistable device is in a second state;
switch means connected to said second output so as to be open when said bistable device is in a first state and to be closed when said bistable device is in a second state;
a first capacitor means connected to said transistor means and to said constant current source so as to be discharged when said transistor means is conductive and to be charged by said constant source when said transistor means is non-conductive, said first capacitor means being additionally connected to said bistable device so that the charging of said first capacitor means to a reference voltage causes said bistable device to go from said second state to said first state; and
second capacitor means connected through said switch means to said constant current source so as to be discharged when said switch means is open and to be charged by said constant current source when said switch means is closed, said second capacitor means providing said output signal of said rate meter.

* * * * *